United States Patent
Baatz et al.

(10) Patent No.: US 7,607,612 B2
(45) Date of Patent: Oct. 27, 2009

(54) PASSENGER SEAT UNIT, IN PARTICULAR FOR COMMERCIAL AIRCRAFT

(75) Inventors: Andreas Baatz, Sauensiek (DE); Michael Supan, Jork (DE); Frank Klepka, Berlin (DE)

(73) Assignee: Airbus Deutschland GmbH (DE)

( * ) Notice: Subject to any disclaimer, the term of this patent is extended or adjusted under 35 U.S.C. 154(b) by 480 days.

(21) Appl. No.: 11/311,858

(22) Filed: Dec. 19, 2005

(65) Prior Publication Data

US 2006/0170261 A1 Aug. 3, 2006

(30) Foreign Application Priority Data

Dec. 22, 2004 (DE) .................. 10 2004 063 094

(51) Int. Cl.
*B64D 11/06* (2006.01)
(52) U.S. Cl. .................................. 244/118.6
(58) Field of Classification Search ............. 244/118.6, 244/118.5; 297/118, 184.1, 184.11, 184.14, 297/160–161, 67, 245
See application file for complete search history.

(56) References Cited

U.S. PATENT DOCUMENTS

| | | | | |
|---|---|---|---|---|
| 1,717,740 | A * | 6/1929 | Simon | 52/781 |
| 6,113,183 | A * | 9/2000 | Koch et al. | 297/184.14 |
| 6,209,956 | B1 * | 4/2001 | Dryburgh et al. | 297/245 |
| 7,108,226 | B2 * | 9/2006 | Quan et al. | 244/118.6 |
| 7,419,214 | B2 * | 9/2008 | Plant | 297/245 |
| 2003/0218095 | A1 | 11/2003 | Saint Jalmes | |
| 2005/0007761 | A1 | 1/2005 | Eversley | |

FOREIGN PATENT DOCUMENTS

| | | |
|---|---|---|
| DE | 195 44 754 A1 | 6/1996 |
| DE | 102 24 048 A1 | 12/2003 |
| WO | WO-03/013942 A1 | 2/2003 |

* cited by examiner

*Primary Examiner*—Tien Dinh
(74) *Attorney, Agent, or Firm*—Lerner, David, Littenberg, Krumholz & Mentlik, LLP

(57) ABSTRACT

A passenger seat unit comprises modular designed elements, such as at least one seat, and shield elements in the head and foot region. The shield elements are formed by seat dividers that are arranged opposite each other, which seat dividers comprise laterally arranged limbs of the partition wall. One side of the limbs of the partition wall encloses a wall element and forms a closed longitudinal side. The other side of the limbs of the partition wall forms a second longitudinal side which frames an access opening. The longitudinal sides comprise means for length adjustment.

Figure 1:
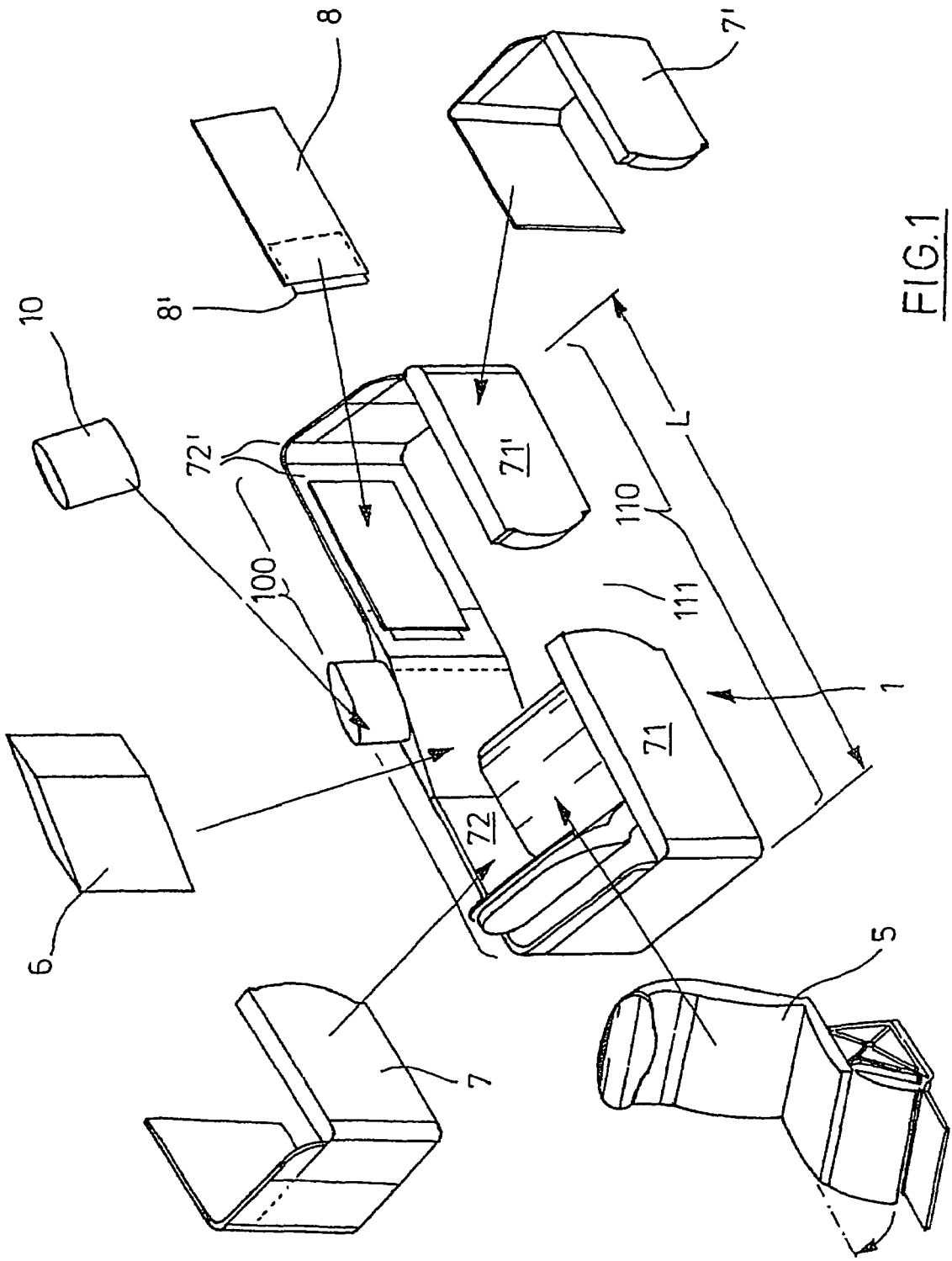

It is particularly advantageous if the passenger seat unit according to the invention makes possible more flexible and more economical use of the existing cabin area in passenger aircraft. Flexible adaptation to various cabin lengths is possible without effort.

15 Claims, 3 Drawing Sheets

PASSENGER SEAT UNIT, IN PARTICULAR FOR COMMERCIAL AIRCRAFT

This application claims the benefit of the filing date of German Patent Application No. 10 2004 063 094.1, filed Dec. 22, 2004, the disclosure of which is hereby incorporated herein by reference.

FIELD OF THE INVENTION

The present invention relates to a passenger seat unit, in particular to a passenger seat unit for commercial aircraft.

TECHNOLOGICAL BACKGROUND

In commercial aircraft it is becoming increasingly common to offer reclining seat units for first-class cabin areas, which reclining seat units on account of their medium-height partition walls are to provide an improved private sphere and the opportunity to relax. Such seat units, for example known from DE 195 44 754, comprise a shell-like enclosure of the comfort seat that can be converted into a bed. Devices for entertaining and informing the passengers can be located in the walls of the enclosure, or said walls can serve to accommodate further elements such as lighting, a foldout table plate or similar. The longitudinal extension of such comfort seats has a particular dimension because the individual seat unit with the surrounding walls is an integral object of fixed length.

In passenger aircraft the available cabin length is predefined depending on the type of aircraft or on the class arrangement in the passenger cabin. The distance between doors is different from one design type to another design type so that the actual cabin sections between the doors of the fuselage are not identical. If the seat units are designed with fixed lengths, it can happen that unusable space remains or that a seat row might have to be done without.

Due to this limitation and the predefined fixed lengths of passenger seat units it can become necessary, in various aircraft types or cabin layouts, to install different types of seat units of different lengths. Initial purchase and keeping different seat types at the ready is thus expensive. Furthermore, delays in changing the seating arrangement can occur if the desired seat type happens not to be available. It is thus possible that the required flexibility and adaptability of airline-related class layouts and the use of a passenger seat unit for various aircraft types is difficult to achieve.

SUMMARY OF THE INVENTION

According to an exemplary embodiment of the invention, a passenger seat unit having the features according to independent claim 1 is provided.

According to an exemplary embodiment of the invention, a passenger seat unit is provided that can flexibly be adapted to different space requirements. In particular, longitudinal adaptation of the seat unit may be possible without effort.

It may be in particular advantageous that with the passenger seat unit according to an exemplary embodiment of the invention more flexible and more economical use of the existing cabin area in passenger aircraft is possible, and that longitudinal adjustments of the seat unit can be made. To this effect, the seat unit, which hitherto has been defined by fixed areas, is broken down into individual modules, wherein with little adaptation expenditure it may become possible to react flexibly to various situations in the aircraft cabin. The modular design may provide the option, apart from adjustment to space, to design components of the seat according to customers' wishes, and thus for example to make possible uniform branding without effort.

A passenger seat unit according to an exemplary embodiment of the invention comprises modular designed elements, such as at least one seat, and shield elements in the head and foot region. The shield elements may be formed by seat dividers that may be arranged opposite each other, which seat dividers may comprise laterally arranged limbs of the partition wall. One side of the limbs of the partition wall may enclose a wall element and may form a closed longitudinal side. The other side of the limbs of the partition wall may form a second longitudinal side which may frame an access opening. The longitudinal sides may comprise means for length adjustment.

It may be particularly advantageous if the passenger seat unit according to an embodiment of the invention makes possible more flexible and more economical use of the existing cabin area in passenger aircraft. Flexible adaptation to various cabin lengths may be possible without effort.

Further improvements and advantageous exemplary embodiments of the invention are stated in claims 2 to 14. Further details and advantages are set out in the following description of embodiments of the invention.

The drawing shows exemplary embodiments of the invention, which below is described in further detail with reference to FIGS. 1 to 4. In the figures, identical components have identical reference characters.

Figure 2:
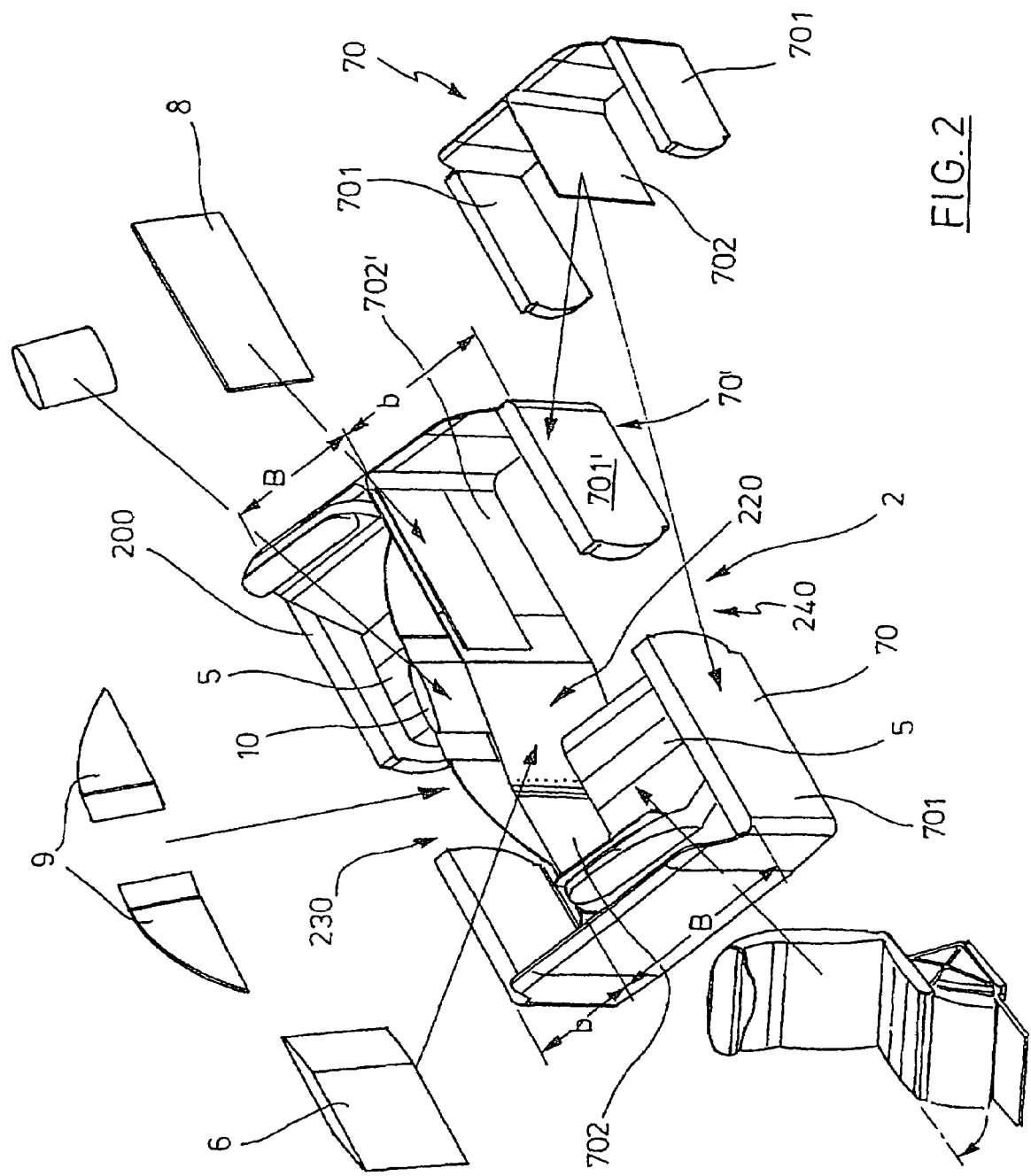
Figure 3:
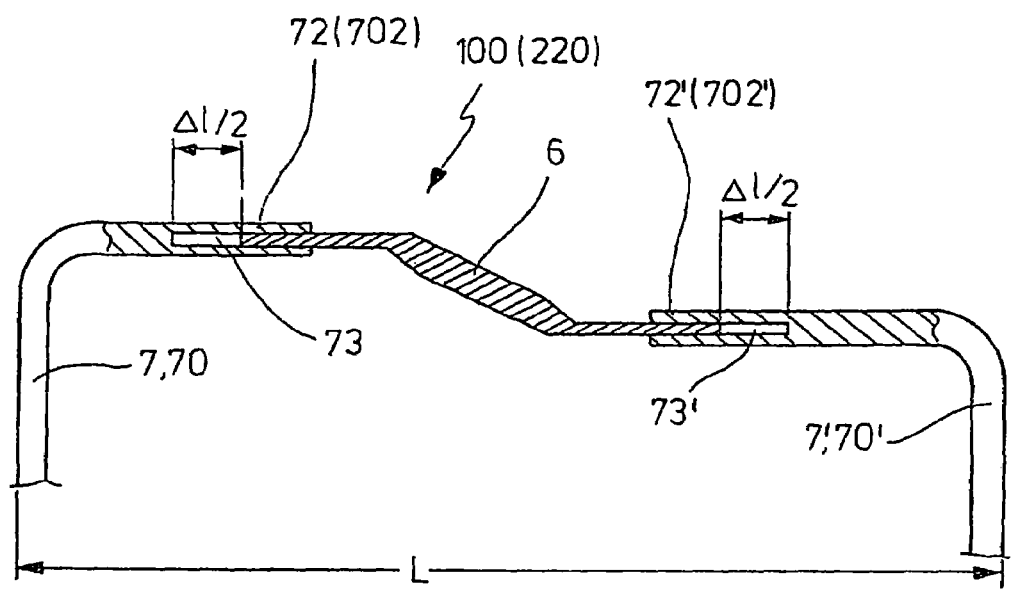
Figure 4:
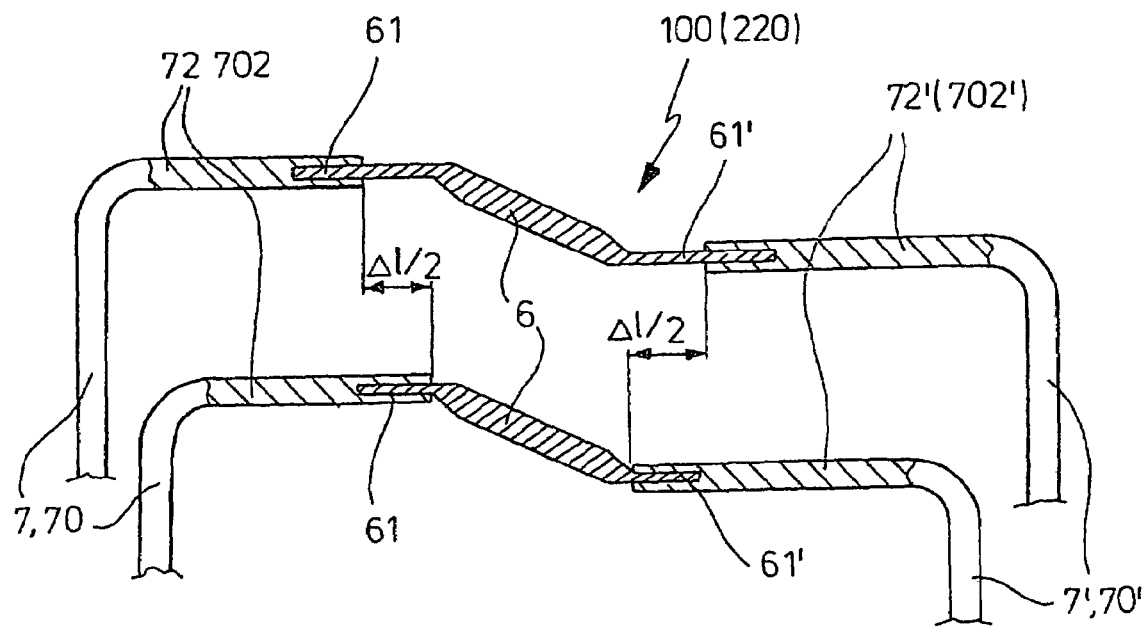

The following are shown:

FIG. 1 a first embodiment of a passenger seat unit according to an exemplary embodiment of the invention, as a single seat;

FIG. 2 a second embodiment of the passenger seat unit according to an exemplary embodiment of the invention, as a double seat; and FIG. 3 and FIG. 4 partial views of the passenger seat unit in the region of wall elements to adapt to changes in length of the passenger seat unit in two embodiments.

DETAILED DESCRIPTION OF EXEMPLARY EMBODIMENTS

FIG. 1 shows a passenger seat unit 1 according to an exemplary embodiment of the invention, wherein the components of said passenger seat unit 1 are shown in an exploded view. In this first embodiment the seat unit 1 is formed as a single seat. The seat unit 1 essentially comprises several individual design components that are put together in a modular way. A passenger seat 5, which is preferably formed as a reclining seat, is framed by shield elements such as a wall element 6 and seat dividers 7 and 7', thus forming a seat unit 1 with an option for the user to withdraw and with a private sphere.

In the embodiment shown, two U-shaped seat dividers 7 and 7', arranged opposite each other, form the essential outside delimitation of the seat unit 1. The seat dividers 7 and 7' can be identical in shape. In this way it is in particular possible to reduce the required number of different individual components, which provides cost advantages both in relation to production and inventory holdings. However, it is also possible to design the seat dividers 7 and 7' differently, for example if due to the existing surroundings in the passenger cabin a different design option presents itself for the foot region of the passenger seat unit 1, or if a narrower design of the seat divider 7' for the foot region is possible to improve or optimise space requirements. In each instance a limb 72, 72' of the partition wall of the opposite seat dividers 7 and 7' are interconnected using a wall element 6 so that they form a closed longitudinal side 100 of the seat unit 1. The other longitudinal side 110 is preferably formed by the other limbs 71, 71' of the partition wall of the U-shaped seat dividers 7 and 7'. However, in this case an access region 111 to the passenger seat unit 1 is provided by omitting the wall element. A significant characteristic of the present passenger seat unit 1 is that the longitudinal sides 100 and 110 being able to be flexibly adapted in their design length (L). This is achieved by means for varying the length in the combination of the wall element 6 and the seat dividers 7 and 7'. Possible arrangements for adapting the design length are shown in detail in FIG. 3 and FIG. 4. For example, there is the option for the wall element 6 to be moved in slits of the seat dividers 7 and 7' or for this element 6 depending on the desired overall length (L) to comprise corresponding dimensions or variable connection pieces. Preferably, the reclining seat 5 is a comfort seat with the usual adjustment options; in particular the seatback can be moved to the horizontal position and thus forms part of the bed. The supplementary part of the bed is provided by the seat area of the seat 5 and a bed floor plate 8. The bed floor plate 8 can preferably be attached to the sidewall of the foot-end seat divider 7' and can be designed so as to be able to be folded away. For the purpose of adaptation to various lengths to establish a connection to the reclining seat 5, the bed floor plate 8 can comprise an adjustable extension piece 8'. When the seat 5 is in its normal position, the floor plate 8 can laterally be folded in to the foot-end seat divider 7' or is stored in said location. An equipment carrier 10 is arranged on the approximately half-height wall element 6. The equipment carrier 10, which can be exchanged for example by means of plug-in connections, can comprise the comfort elements that are presently standard features in comfort seats, as well as the associated electronics and electrics. On the side or laterally of the equipment carrier 10 there are attachment points for screens or sight shield, which are however used only as required. One example of the use of the screen is shown in FIG. 2. During takeoff and landing the seat 5 has to be in its upright normal position, and in addition there has to be the possibility for the cabin crew to monitor passengers' compliance with the requirement to fasten seat belts. For this reason, the height of the screen elements 6, 7, 7' around the seat 5 is limited to approximately 1.20 m, or video cameras make it possible for members of the cabin crew to visually monitor the passenger.

FIG. 2 shows the passenger seat unit in the embodiment of a double seat unit 2 with two seats facing each other. A double-seat seat divider 70 for this embodiment comprises outer limbs 701 of the partition wall, as well as a middle dividing wall 702. The double-seat seat dividers 70 and 70' are absolutely identical in design in the head and foot regions; a factor which provides advantages in procurement, service and inventory holdings. The double-seat seat dividers 70 and 70' form an approximately rectangular frame, wherein in each case access openings 230 and 240 to the seats 5 have been left on the outer longitudinal sides 200 and 210. As shown in the drawing, the double passenger seat unit 2 is associated with a further advantage in that individual design modules occur only once, for example the screen 9, the equipment carrier 10 and the wall element 6. In combination with the wall element 6 the middle dividing walls 702 and 702' form the partition wall 220. An adaptation to the change in length can be achieved in a way similar to the adaptation in the first embodiment using means to vary the length in the combination comprising the wall element 6 and the middle screens 702 and 702'. FIGS. 3 and 4 show possible embodiments. The screen 9 is needed when passengers require improved screening of their private spheres. Said screen 9 can however also be designed so as to be easily demountable if the passengers of the double seat unit 2 travel together. In the design of a double-seat divider 70 the overall width of the seat divider for the double-seat arrangement (B+b) can be smaller than in comparison to two seats 5 and seat dividers 7 arranged side-by-side. The more favourable width (B+b) arises as a result of the reduced space requirement in the foot region. Thus the width b can be 15-25% narrower than the width B, which in the cabin in the case of seat units installed side by side amounts to quite a considerable saving of space.

Not shown is an alternative to the double seat unit 2, which is implemented with two separate individual seat units 1. These individual seat units 1 are arranged side by side, but with the seats facing each other. Due to a narrower seat part in the foot region 7' in such a slanted opposed arrangement of the seats 5, space is also saved.

FIGS. 3 and 4 each show a partial view of the passenger seat unit 1 in the region of the first longitudinal side 100 with means for length adaptation. The region of the partition wall 220 of a double passenger unit 2 also comprises such means. An adaptation to changes in length in the passenger seat units 1 and 2, respectively, is shown in two embodiments (FIGS. 3 and 4).

A change in length (ΔL) can be achieved by designing the transition of the opposite limbs 72, 72' and 702, 702', respectively, of the partition wall of the seat dividers 7, 7' and 70, 70', respectively, and the wall element 6 that is situated in between. FIG. 3 shows one option of varying the length by sliding the wall element 6 and the seat dividers 7, 7' and 70, 70', respectively, inside one another. To this effect a slit 73, 73' of a depth (ΔL/2) is milled in the fronts of the limbs 72, 72' and 702, 702', respectively, of the partition wall of the seat dividers. Corresponding to the necessary length adjustment, the ends of the wall element 6 are slidable in these slits 73 and 73'. It is visible that the seat dividers 7 and 70 in the head region are wider than the seat dividers 7' and 70' are in the foot region. Adjustment in width is made possible by the design shape of the wall element.

FIG. 4 shows a solution with variable-length extension pieces 61 and 61' of the wall element 6. The wall element 6 can also be variable in length L by means of sub-elements that can be slid into each other or past each other, or by bellows-like elements. The option of only designing the wall element 6 so that it is variable in length can advantageously achieve a solution where the entire seat unit 1 and/or 2 can be adapted to various design lengths without effort, merely by changing a component.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A passenger seat unit, in particular for a commercial aircraft, the passenger seat unit comprising:
    modular designed elements including a first shield element in a head region and a second shield element in a foot region;
    wherein the shield elements are formed by seat dividers that are arranged opposite each other, which seat dividers comprise laterally arranged partition wall limbs,
    wherein one side of the partition wall limbs encloses a wall element and forms a closed longitudinal side,
    wherein the other side of the partition wall limbs forms a second longitudinal side which frames an access opening; and wherein the wall limbs and the wall element are configured to interact with one another in such a way that the length of the closed longitudinal side may be adjustable, thereby adjusting the length of the passenger seat unit.

2. The passenger seat unit of claim 1, wherein the wall element is insertable into and slidable in slits on the fronts of the partition wall limbs.

3. The passenger seat unit of claim 1, wherein the wall element comprises extension pieces.

4. The passenger seat unit of claim 1, wherein the wall element is adjustable in width using at least one of the group consisting of slidable sub-elements and bellows-like elements.

5. The passenger seat unit of claim 1, wherein, in order to form a double seat unit, two seats are arranged so as to face each other at an offset.

6. The passenger seat unit of claim 5, wherein the seat dividers that are arranged opposite each other comprise middle dividing walls which in combination with the wall element form a partition wall between the seats.

7. The passenger seat unit of claim 5, wherein two individual seat units arranged side by side form a double seat unit with seats that are arranged so as to face each other.

8. The passenger seat unit of claim 1, wherein the seat dividers arranged opposite each other are of different widths which are compensatable in connection with the wall element.

9. The passenger seat unit of claim 1, wherein the seat dividers arranged opposite each other are of identical design.

10. The passenger seat unit of claim 1, wherein at the seat divider forming the second shield element a bed floor plate, preferably comprising an adjustable extension piece, is arranged.

11. The passenger seat unit of claim 1, wherein an equipment carrier for information and comfort elements is arranged on the wall element.

12. The passenger seat unit of claim 1, wherein sight shields are arranged on at least one of the group consisting of the wall element and the partition wall limbs.

13. The passenger seat unit of claim 1, wherein the modular designed elements comprise at least one seat.

14. The passenger seat unit of claim 1, wherein the wall element is nonlinear.

15. The passenger seat unit of claim 1, wherein the seat dividers arranged opposite each other are of substantially similar design.

* * * * *